United States Patent

Masui et al.

[11] Patent Number: 5,981,046
[45] Date of Patent: *Nov. 9, 1999

[54] SOUND ABSORBING COMPONENT

[75] Inventors: Syohei Masui, Soraku-gun; Satoru Funakoshi, Osaka; Taiji Matsumoto, Chiba; Katsuhiro Nagayama, Chiba; Masami Fujimaki, Chiba; Hiroyuki Yoshitake, Chiba; Mituaki Sunada, Chiba, all of Japan

[73] Assignees: Sumitomo Chemical Company, Limited, Osaka; Kawasaki Steel Corporation, Kobe; K-Plasheet Corporation, Chiba, all of Japan

[*] Notice: This patent is subject to a terminal disclaimer.

[21] Appl. No.: 08/737,441
[22] PCT Filed: Mar. 13, 1996
[86] PCT No.: PCT/JP96/00618

§ 371 Date: Nov. 12, 1996

§ 102(e) Date: Nov. 12, 1996

[87] PCT Pub. No.: WO96/28297

PCT Pub. Date: Sep. 19, 1996

[30] Foreign Application Priority Data

Mar. 13, 1995 [JP] Japan ................................ 7-052444
Mar. 13, 1995 [JP] Japan ................................ 7-052445
Jun. 22, 1995 [JP] Japan ................................ 7-156077

[51] Int. Cl.$^6$ ........................................... B32B 5/18
[52] U.S. Cl. ..................... 428/213; 428/220; 428/317.9; 428/297.1
[58] Field of Search ................... 428/213, 309.9, 428/316.6, 317.9, 71, 306.6, 220, 297.1

[56] References Cited

U.S. PATENT DOCUMENTS

| | | | |
|---|---|---|---|
| 4,190,697 | 2/1980 | Ahrens | 428/315 |
| 4,476,183 | 10/1984 | Holtrop et al. | 428/286 |
| 4,798,756 | 1/1989 | Fukushima et al. | 428/198 |
| 4,925,615 | 5/1990 | Willis et al. | 264/257 |
| 5,149,574 | 9/1992 | Gross et al. | 428/116 |
| 5,438,171 | 8/1995 | Schmanski | 181/210 |
| 5,532,440 | 7/1996 | Fujisawa | 181/289 |

FOREIGN PATENT DOCUMENTS

| | | |
|---|---|---|
| 56-151131 | 11/1981 | Japan . |
| 62-70922 | 5/1987 | Japan . |
| 6-156261 | 6/1994 | Japan . |
| 6-332466 | 12/1994 | Japan . |
| 244150 | 9/1996 | Japan . |

Primary Examiner—Keith D. MacMillan
Assistant Examiner—T. D. Wessendorf
Attorney, Agent, or Firm—Pillsbury Madison & Sutro LLP

[57] ABSTRACT

A sound absorbing component contains a fiber-reinforced thermoplastic resin expanded body having a percentage of void being not less than 50 vol %, and a resin molded body. An air layer is provided between the fiber-reinforced thermoplastic resin expanded body and the resin molded body. This sound absorbing component can effectively absorb the sound especially in the frequency region of 500 to 3000 Hz corresponding to the exterior noise problematic in automobiles, even if it is lightweight and thin.

9 Claims, 11 Drawing Sheets

SOUND ABSORBING COMPONENT

This application is the national phase of international application PCT/JP96/00618, filed Mar. 13, 1996 which designated the U.S.

TECHNICAL FIELD

The present invention relates to a sound absorbing component.

BACKGROUND ART

Sound absorbing materials have been used heretofore in many fields and are often used typically for walls and ceilings of anechoic room.

A specific example of such sound absorbing materials generally used is a combination of plate-shaped sound absorbing components in which woven cloth covers a porous material such as glass wool. These components are suitably applicable to applications in a relatively large scale such as the anechoic room, but are not suitable for sound absorbing components for automobile such as components in an automobile engine room including an automobile engine cover. Requirements for sound absorbing components for automobile are capability of being used in a limited space and capability of exhibiting a sufficient sound absorbing effect. The conventional sound absorbing materials as described above, however, has a lot of problems; for example, it was not easy to freely shape them so as to be compatible with the space, their sound absorbing performance was degraded by absorption of oil or water, an increase of the weight due to the absorption of oil or water made retention of the shape difficult, and so on.

Also known are sound absorbing materials using a foamed body having isolated cells, i.e., cells not communicating with each other. They had, however, problems that the mechanical strength was poor and that a sufficient sound absorbing effect was not attained especially in the high-frequency region.

Further, the sound absorbing components for automobile, such as those for automobile engine and its surroundings, must have not only excellent sound absorbing performance, but also be light in weight. In addition, since they are used in a narrow limited space, the sound absorbing components themselves are required to be compact and thin. Therefore, the sound absorbing components for automobile are excellent in the sound absorbing performance even if being thin and to be readily producible even if being compact. However, the sound absorbing components conventionally known are inadequate in these respects.

An object of the present invention is to provide a sound absorbing component which can be readily produced not only in a relatively large scale, but also in the form of a compact sound absorbing component, which is excellent in the sound absorbing performance even if lightweight and compact, and which can effectively absorb the sound, especially, in the frequency region 500 to 3000 Hz of exterior noise considered to be problematic in automobiles.

DISCLOSURE OF THE INVENTION

A first sound absorbing component of the present invention is a sound absorbing component comprising a fiber-reinforced thermoplastic resin expanded body having a percentage of voids being not less than 50 vol %, and a resin molded body, in which an air layer is provided between the fiber-reinforced thermoplastic resin expanded body and the resin molded body. Since, in the first sound absorbing component of the present invention having such a structure, the air layer shifts to the lower frequency side the wavelength region of the sound effectively absorbed by the fiber-reinforced thermoplastic resin expanded body, the sound can be effectively absorbed in the frequency region of 500 to 3000 Hz even if the fiber-reinforced thermoplastic resin expanded body is thin. Accordingly, the first sound absorbing component of the present invention has excellent sound absorbing performance even if it is lightweight and thin and, in addition, the first sound absorbing component of the present invention is press-formable, thus being readily producible either on a large scale or on a small scale.

Further, a second sound absorbing component of the present invention is a sound absorbing component comprising a fiber-reinforced thermoplastic resin expanded body having a percentage of voids being not less than 50 vol %, and a thermoplastic resin foamed body, in which the thermoplastic resin foamed body is placed on a part of the fiber-reinforced thermoplastic resin expanded body. Since the second sound absorbing component of the present invention having such a structure effectively absorbs both the sound in the wavelength region effectively absorbed by the fiber-reinforced thermoplastic resin expanded body and the sound in the wavelength region effectively absorbed by the thermoplastic resin foamed body, it can effectively absorb the sound in the frequency region of 500 to 3000 Hz even if the fiber-reinforced thermoplastic resin expanded body is thin. Accordingly, the second sound absorbing component of the present invention has excellent sound absorbing performance even if light and thin and, in addition, the second sound absorbing component of the present invention can be press-formable, thus being readily producible either on a large scale or on a small scale.

The present invention is also directed to applications of the first or second sound absorbing component of the present invention to sound absorbing components for automobiles. Since the above first and second sound absorbing components of the present invention have excellent sound absorbing performance even if light and thin, it is easy to set them around the automobile engine or the like and their applications to the sound absorbing components for automobiles are effective to shut out the exterior sound in the frequency region of 500 to 3000 Hz and to achieve a weight reduction of automobiles.

BEST MODE FOR CARRYING OUT THE INVENTION

Figure 1:
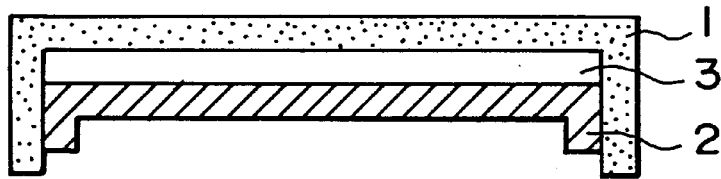
FIG. 1 to FIG. 5 are sectional views of various examples of the sound absorbing component of the present invention, respectively.

The present invention will be explained in more detail. First explained is the first sound absorbing component of the present invention.

The first sound absorbing component of the present invention has the fiber-reinforced thermoplastic resin expanded body having the percentage of voids being not less than 50 vol %, and the resin molded body. There is the air layer provided between the fiber-reinforced thermoplastic resin expanded body and the resin molded body.

Each of FIG. 1 to FIG. 5 shows a sectional view of an example of the first sound absorbing component of the present invention, which is comprised of a resin molded body (1) to be a core, a fiber-reinforced thermoplastic resin expanded body (2) having the percentage of voids being not less than 50 vol % to be a sound absorbing portion (hereinafter referred to simply as a fiber-reinforced thermoplastic resin expanded body), and an air layer (3) interposed between them.

The resin molded body (1) that forms the core is normally molded from a thermoplastic resin into a shape suitable for each place of application. The thermoplastic resin can be a molding material and may be any one selected from the thermoplastic resins normally used in compression molding, injection molding, injection compression molding, extrusion molding, and so on. Specific examples of such resins include the ordinary thermoplastic resins such as polyolefins (for example, polyethylene and polypropylene), polystyrene, acrylonitrile-styrene-butadiene copolymer, polyvinyl chloride, polyamide, polycarbonate, polyethylene terephthalate, polybutylene terephthalate, polyphenylene ether and styrene-acrylonitrile copolymer; thermoplastic elastomers; mixtures thereof; and polymer alloys using these thermoplastic resins. A resin is properly selected from the listed resins, depending upon the strength, weight, and heat resistance required.

The resin molded body (1) is produced by a generally known method such as the compression molding, injection molding or injection compression molding from the raw material of the thermoplastic resin. For example, when it is formed by the injection molding, a pair of female and male molds with a cavity processed in a desired shape are used, the thermoplastic resin in a molten state is supplied into the cavity through a resin-supplying gate opening in the cavity surface of either one of the female and male molds while the two molds are closed under predetermined pressure, the resin is cooled and solidified while keeping the pressure, and a molded product is taken out, thus readily producing the molded body. The resin molded body (1) preferably has the percentage of voids being almost 0 vol %, i.e., has substantially no voids.

Of course, this is just an example, and a molding method can be properly selected depending upon the shape or in some cases the resin molded body (1) may be obtained as a combination of separately molded components as bonded to each other.

The fiber-reinforced thermoplastic resin expanded body (2) that is to be the sound absorbing portion needs to have a percentage of voids not less than 50 vol % in terms of the strength, lightweight, and sound absorbing properties; preferably 70 to 95 vol %, and more preferably 85 to 95 vol %. When the percentage of voids is not less than 50 vol %, the sound absorbing performance by the resin expanded body is enhanced. This tendency becomes more outstanding when it is not less than 70 vol %.

The thickness of the fiber-reinforced thermoplastic resin expanded body (2) is preferably 2 or more mm in the major part of the sound absorbing component from the aspects of strength and sound absorbing property. On the other hand, if the thickness of the resin expanded body (2) is too large, the size of the sound absorbing component will increase, which makes it difficult to position it around the automobile engine or the like. Thus, the thickness thereof is preferably not more than 30 mm.

The fiber-reinforced thermoplastic resin expanded body having the above percentage of void can be readily obtained, for example, by subjecting a fiber-reinforced thermoplastic resin sheet obtained by a papermaking method (filtering method) to expansion molding. Namely, such a papermaking-method fiber-reinforced thermoplastic resin sheet is a sheet-like molding stock having the percentage of voids being less than 30 vol %, preferably 0 to 20 vol % approximately, for example, obtained by making a non-woven material (papermaking web) by a papermaking method from a fluid dispersion (suspension) in which reinforcing fibers and thermoplastic resin powder are uniformly mixed in water, and then heating and pressing the non-woven material. The fiber-reinforced thermoplastic resin expanded body (2) of the percentage of voids being not less than 50 vol %, used as a sound absorbing portion according to the present invention, can be readily produced by the expansion molding process arranged either to heat the above fiber-reinforced thermoplastic resin sheet to expand it in the thickwise direction by spring back force of reinforcing fibers until it comes to have a desired percentage of voids and to mold it into a desired shape as expanding, or to pre-heat the sheet to expand it in the thickwise direction up to a percentage of voids over the desired percentage and thereafter again to press to compress the sheet as maintaining the pre-heat state into the desired percentage of voids and the desired shape. The usually adopted process is the latter expansion molding process because of its good moldability.

Figure 6:
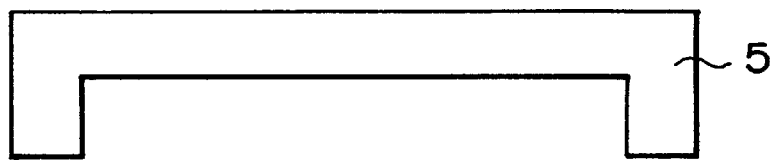
FIG. 6 and FIG. 7 are schematic sectional views of various examples of molds used for the present invention, respectively.
Figure 7:
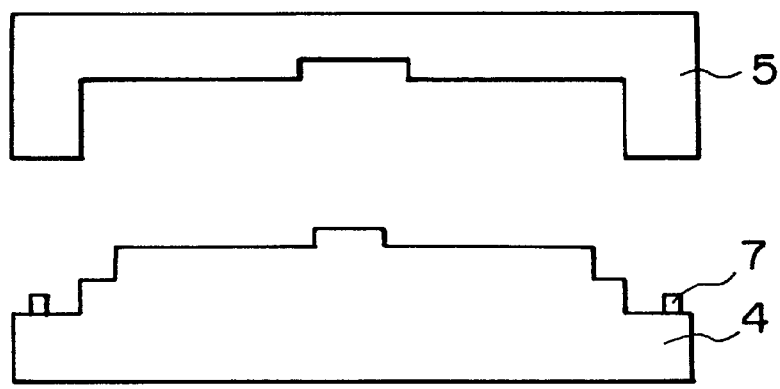
Figure 8:
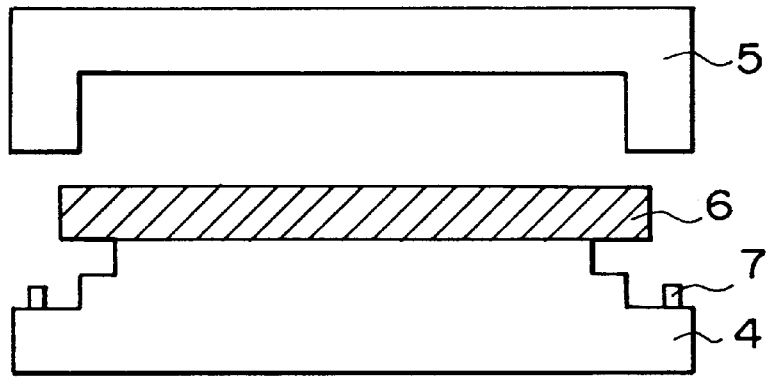
FIG. 8 and FIG. 9 are schematic sectional views of molds to show production steps in an example of production of a sound absorbing portion, respectively.
Figure 9:
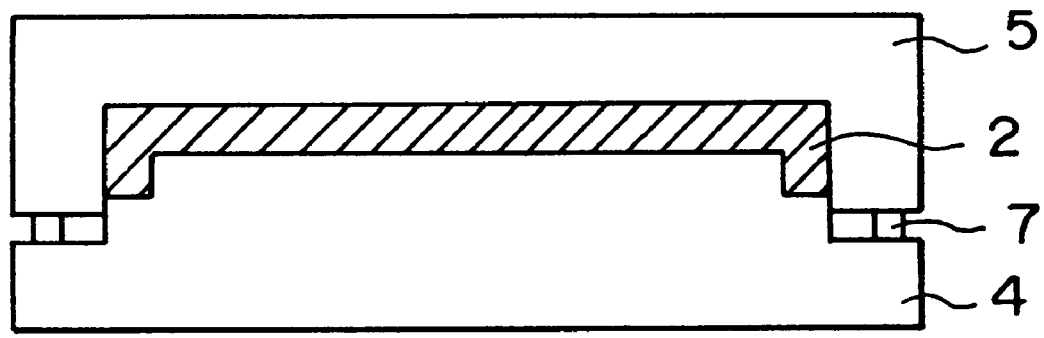

In the case of the expansion molding process, the process is arranged to use a pair of upper and lower molds (4, 5) having the cavity processed in a stereoscopic shape corresponding to a desired shape of a sound absorbing portion, for example as shown in FIG. 6 or FIG. 7, the fiber-reinforced thermoplastic resin sheet is pre-heated to a temperature not lower than the melting point but lower than the decomposition point of the matrix resin in a far-infrared heating furnace to expand in the thickwise direction up to the percentage of void of not less than 50 vol %, preferably not less than 80 vol %, this expanded fiber-reinforced thermoplastic resin sheet (6) is supplied to between the female and male molds in an open state while maintaining the pre-heat condition (FIG. 8), thereafter the molds are closed to shape the expanded fiber-reinforced thermoplastic resin sheet into the desired shape so as to change the percentage of void of the sheet into the desired percentage of void of not less than 50 vol % (FIG. 9), and a molded product, after cooled, is taken out, thus obtaining the fiber-reinforced thermoplastic resin expanded body (2) to be a sound absorbing portion.

On this occasion, for example, by adjusting the height of stopper (7) disposed outside the outer periphery of the male mold, the cavity clearance at the end of mold closing can be adjusted so as to achieve the desired percentage of void not less than 50 vol %. When the sound absorbing portion is of a complex shape or of a deeply drawn shape, the expanded fiber-reinforced thermoplastic resin sheet (6) may wrinkle or break in the molding process, and it is thus effective to hold the sheet by a clamp frame or the like during supply of the sheet.

The reinforcing fibers used for producing the fiber-reinforced thermoplastic resin expanded body are selected from various inorganic fibers such as glass fibers, carbon fibers, or metal fibers (for example, stainless steel fibers), organic fibers such as aramid fibers, or any combination of the foregoing, or the like. Fiber diameters, fiber lengths, and fiber content of these fibers are properly selected so as to attain a desired sound absorbing effect, but preferable fibers have the fiber diameters ranging from 1 to 50 $\mu$m (more preferably, from 3 to 30 $\mu$m) and the lengths ranging from 3 to 50 mm (more preferably, from 5 to 50 mm). Among these reinforcing fibers, the glass fibers are especially advantageously used because they can achieve high sound absorption and reinforcement effects at low cost.

Examples of the thermoplastic resin being the matrix resin for producing the fiber-reinforced thermoplastic resin expanded body include the thermoplastic resins ordinarily used in the compression molding, injection molding, injection compression molding, extrusion molding, and so on, similar to those exemplified previously as the resins for the resin molded body, the thermoplastic elastomers, modifications thereof, mixtures thereof, or polymer alloys using these thermoplastic resins.

The fiber-reinforced thermoplastic resin expanded body (2) to be the sound absorbing portion is united with the resin molded body (1) to be a core member with a clearance to be the air layer (3) between them. With an increase of the thickness of the air layer (3) the frequency region of sound effectively absorbed is shifted to the lower frequency side, as described later, and the thickness thereof is preferably not less than 10 mm. When the thickness of the air layer (3) is determined to be not less than 10 mm as described, the sound can be effectively absorbed in the frequency region of 500 to 3000 Hz even if the thickness of the fiber-reinforced thermoplastic resin expanded body (2) is thin, about 2 to 30 mm. On the other hand, if the thickness of the air layer (3) is too large, the size of the sound absorbing component will be large, which makes it difficult to place it around the automobile engine or the like. Thus, the thickness is preferably not more than 50 mm.

Figure 10:
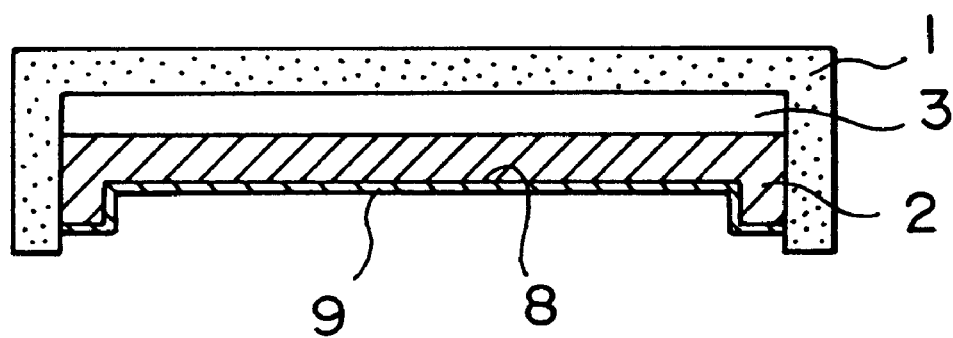
FIG. 10 is a sectional view of another example of the sound absorbing component of the present invention.

As shown in FIG. 10, a film layer (9) may be placed (or bonded) on at least a part of the surface (8) of the fiber-reinforced thermoplastic resin expanded body (2) on the opposite side to the resin molded body (1). In this case, the film layer (9) prevents oil or water from being absorbed into the expanded body (2), thereby preventing degradation of the sound absorbing property and further improving the sound absorbing performance on the low frequency side.

A material for the film used for such a purpose is preferably a resin of a structure identical with or similar to the matrix resin of the resin expanded body, taking account of adhesion to the fiber-reinforced thermoplastic resin expanded body, but it may be another material if it has good adhesion or a laminate film thereof with another material, which may be properly selected depending upon a purpose of application.

There is no specific limitation on the thickness of the film layer (9) as long as the thickness is sufficient to attain the above effect. Although it depends upon the material, application place, and so on, the preferable range of the thickness is approximately between 20 and 100 $\mu$m, because a too thick film layer would degrade the sound absorbing characteristics (especially, on the higher frequency side). Optionally, a skin material, a print sheet, or the like for decoration purpose may be bonded to the surface of the resin molded body (1).

The resin molded body (1) and fiber-reinforced thermoplastic resin expanded body (2) described above are integrally united with each other by an adhesive or by thermal bonding, and it is very important on this occasion to unite them with the air layer (3) between them in order to improve the sound absorbing characteristics.

Here, the thickness of the resin molded body is arbitrarily selected depending upon each purpose of application. Depending upon the purpose of application as a sound absorbing component, the thickness may be uniform throughout the all portions or may differ in the main portion from those in the other portions. In addition, a skin material, a print sheet, or the like for decoration purpose may be bonded to the surface.

The fiber-reinforced thermoplastic resin expanded body does not have to be formed in a uniform thickness throughout the entire region thereof, but from the point of view of the sound absorbing property, the thicker the resin expanded body is, the higher the sound absorbing effect, and thus the thickness is preferably 1 or more mm at least in the major part of the expanded body as a sound absorbing component, more preferably 2 or more mm. Further, the thickness of the air layer is preferably 1 or more mm, more preferably 10 or more mm, in order to improve the sound absorbing characteristics, and the total thickness of the air layer and the fiber-reinforced thermoplastic resin body is preferably 4 or more mm, more preferably 12 or more mm, in the major part as a sound absorbing component.

The percentage of voids for the fiber-reinforced thermoplastic resin expanded body can be freely set by partially changing the thickness, and, depending upon the dimensions of the sound absorbing component, the mounting space, and the sound absorbing performance required, the thickness of the fiber-reinforced thermoplastic resin sheet, being the raw material, and the void percentage after molding of the fiber-reinforced thermoplastic resin expanded body can be suitably selected.

It is also possible to improve the sound absorbing property more by forming an irregular configuration on the surface of the fiber-reinforced thermoplastic resin expanded body on the air layer side, i.e., on the resin molded body side, or on the surface on the back surface side of the expanded body, i.e., on the opposite side to the resin molded body, or on the both surfaces, thereby increasing the surface area of the fiber-reinforced thermoplastic resin expanded body.

Figure 3:
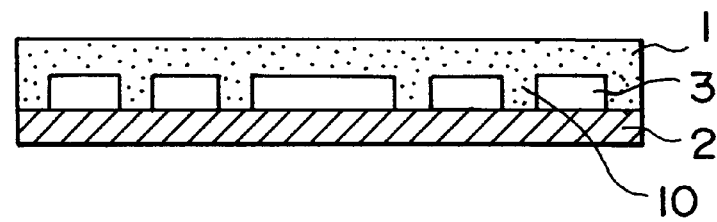
Figure 4:
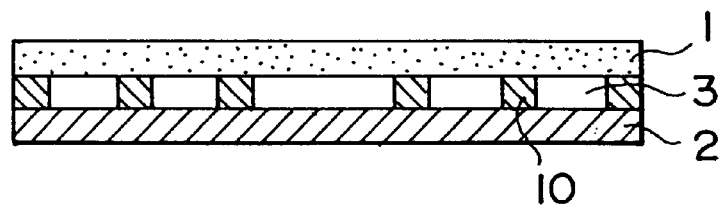
Figure 5:
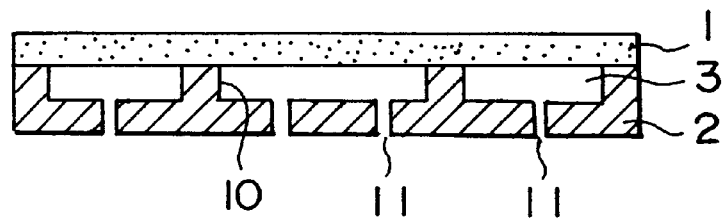

The resin molded body (1) and fiber-reinforced thermoplastic resin expanded body (2) may be united with each other, for example, in such a manner that ribs (10) of a column shape or a plate shape are preliminarily produced at a height corresponding to the thickness of the desired air layer (3), using a same or different type of material from the materials for the bodies, and they are united at the both ends of the ribs (FIG. 4). Another example may be arranged in such a manner that, when the fiber-reinforced thermoplastic resin expanded body is produced by the foregoing method using the fiber-reinforced thermoplastic resin sheet, ribs (10) of a column shape, a plate shape, or a block shape are formed at the height corresponding to the thickness of the desired air layer (3) and as parts of the resin expanded body or a recess and projection configuration corresponding to the ribs is formed, and the tip ends of the ribs (10) or the tip ends of the projecting portions are united with the back face of the resin molded body (1) (FIG. 5). A further example may be arranged in such a manner that, upon molding of the resin molded body (1), ribs (10) of a column shape, a plate shape, or a block shape are simultaneously formed at the height corresponding to the thickness of the desired air layer (3) on the back surface of the resin molded body and the tip ends of the ribs (10) are united with the fiber-reinforced thermoplastic resin expanded body (2) (FIG. 3).

The air layer (3) may be partitioned by the ribs (10) or the like so that they may exist independently of each other or so that these partitioned spaces of the air layer may be in communication with each other. Configurations of the respective spaces of the air layer can be suitably selected according to each place of use by the number of ribs, the clearance, locations, etc., and the portions corresponding to the ribs for forming these spaces of the air layer can also function to improve the strength of the fiber-reinforced thermoplastic resin expanded body. The air layer (3) does not have to be formed in the same thickness throughout the all portions, but may be formed partly in different thicknesses.

The uniting method between the resin molded body and the fiber-reinforced thermoplastic resin expanded body may be any uniting method, for example, an ordinary method using an adhesive or an adhesive tape, a method of thermal bonding, or a mounting method using metal or resin mounting components.

In the sound absorbing component of the present invention, the shape of the sound absorbing component itself is suitably selected according to the application circumstance of the sound absorbing component, and thus there is no specific restrictions thereon as long as it has the essential construction of the present invention as discussed above; the fiber-reinforced thermoplastic resin expanded body being the sound absorbing portion may be provided over the entire surface of the to-be-covered surface portion of the resin molded body being the core member or only in the portions desired to have the sound absorbing property.

A plurality of resin molded bodies or fiber-reinforced thermoplastic resin expanded bodies may be suitably combined in a same sound absorbing component. Further, through holes (11), such as round holes, communicating with the air layer may be formed in the fiber-reinforced thermoplastic resin expanded body in order to enhance the heat radiation effect (FIG. 5).

Next explained is the second sound absorbing component of the present invention.

The second sound absorbing component of the present invention has the fiber-reinforced thermoplastic resin expanded body with the percentage of voids being not less than 50 vol %, and the thermoplastic resin foamed body. Further, the thermoplastic resin foamed body is placed on a part of the fiber-reinforced thermoplastic resin expanded body.

Figure 11:
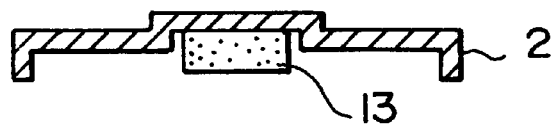
FIG. 11 and FIG. 12 are sectional views of still other examples of the sound absorbing component of the present invention, respectively.
Figure 12:
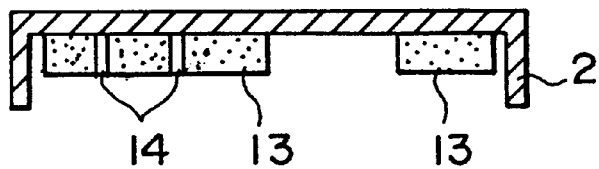

FIG. 11 and FIG. 12 are sectional views to show respective examples of the second sound absorbing component of the present invention, each of which is composed of a core/sound absorbing portion comprised of a fiber-reinforced thermoplastic resin expanded body having the percentage of voids being not less than 50 vol % (hereinafter called simply as a fiber-reinforced thermoplastic resin expanded body) (2), and a thermoplastic resin foamed body or thermoplastic resin foamed bodies (13) placed (or integrally stacked) on a part or parts of the fiber-reinforced thermoplastic resin expanded body.

Since the fiber-reinforced thermoplastic resin molded body (2), becoming the core/sound absorbing portion in the second sound absorbing component of the present invention, is a sound absorbing member also serving as a structural member per se, it needs to have the percentage of voids is not less than 50 vol % from the points of the strength, light-weight, and sound absorbing properties, preferably 70 to 95 vol %, and more preferably 80 to 90 vol %. When the percentage of void is not less than 50 vol %, the sound absorbing performance by the resin expanded body is enhanced. This tendency becomes more outstanding when the percentage of voids is not less than 70 vol %.

Since with an increase of the thickness of the fiber-reinforced thermoplastic resin expanded body (2) the frequency region of the sound effectively absorbed is shifted to the lower frequency side, as described later, the thickness thereof is preferably not less than 5 mm. On the other hand, a too thick resin expanded body (2) would increase the size of the sound absorbing component so as to make it difficult to place the sound absorbing component around the automobile engine or the like, and thus the thickness thereof is preferably not more than 30 mm.

The fiber-reinforced thermoplastic resin expanded body having the above percentage of void can be readily obtained, for example, by subjecting a fiber-reinforced thermoplastic resin sheet obtained by a papermaking method to expansion molding. Namely, such a papermaking-method fiber-reinforced thermoplastic resin sheet is a sheet-like molding stock having the percentage of voids being less than 30 vol %, preferably 0 to 20 vol % approximately, for example, obtained by making a non-woven material (sheet-making web) by a papermaking method from a fluid dispersion (suspension) in which reinforcing fibers and thermoplastic resin powder are uniformly mixed in water, and then heating and pressing the non-woven material. The fiber-reinforced thermoplastic resin expanded body (2) of the percentage of voids being not less than 50 vol %, used as a core/sound absorbing portion according to the present invention, can be readily produced by the expansion molding process arranged either to heat the above fiber-reinforced thermoplastic resin sheet to expand it in the thickwise direction by spring back force of reinforcing fibers until it comes to have a desired percentage of voids and to mold it into a desired shape as expanding, or to pre-heat the sheet to expand it in the thickwise direction up to a percentage of void over the desired percentage and thereafter again to press to compress the sheet as maintaining the pre-heat state into the desired percentage of void and the desired shape. The usually adopted process is the latter expansion molding process because of its good moldability.

The thickness of such a fiber-reinforced thermoplastic resin expanded body can be arbitrarily determined according to a purpose of use. The thicker the thickness, the higher the sound absorbing effect. Specifically, the thickness is suitably selected from the aspects of the sound absorbing effect and the strength as a sound absorbing component. The sound absorbing component does not have to be formed in a same thickness throughout the all portions thereof, but can be formed in partially different thicknesses. The thickness of the major part may be different from those of the other portions. The fiber-reinforced thermoplastic resin expanded body may have partially different percentages of voids as long as they are not less than 50 vol %. The void percentages are suitably selected from the aspects of desired sound absorbing effect and strength.

Figure 13:
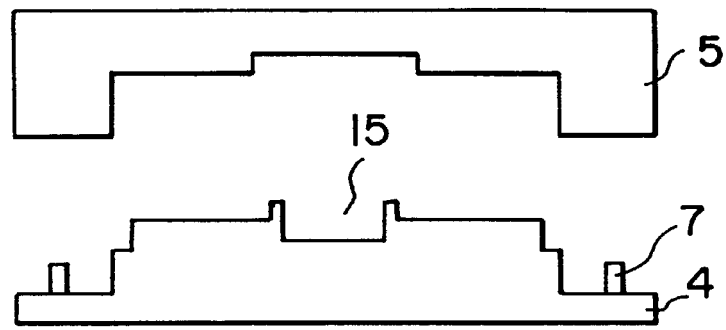
FIG. 13 is a schematic sectional view of another example of molds used for the present invention.

In the case of the expansion molding process, the process is arranged to use a pair of female and male molds (4, 5) having the cavity processed in a stereoscopic shape corresponding to the shape of the core/sound absorbing portion, for example as shown in FIG. 13, the fiber-reinforced thermoplastic resin sheet is pre-heated to a temperature not lower than the melting point but lower than the decomposition point of the matrix resin in the far-infrared heating furnace to expand in the thickwise direction up to the percentage of voids of not less than 50 vol %, preferably not less than 80 vol %, this expanded fiber-reinforced thermoplastic resin sheet (6) is supplied to between the female and male molds in an open state while maintaining the pre-heat condition (FIG. 14), thereafter the molds are closed to shape the expanded fiber-reinforced thermoplastic resin sheet into the desired shape so as to change the percentage of voids of the sheet into the desired percentage of void of not less than 50 vol % (FIG. 15), and a molded product, after cooled, is taken out, thus obtaining the fiber-reinforced thermoplastic resin expanded body (2) to be the core/sound absorbing portion.

The reinforcing fibers used for producing the fiber-reinforced thermoplastic resin expanded body are selected from various inorganic fibers such as glass fibers, carbon fibers or metal fibers (for example, stainless steel fibers), organic fibers such as aramid fibers, or any combination of the foregoing, or the like. Fiber diameters, fiber lengths, and fiber content of these fibers are properly selected so as to attain a desired sound absorbing effect, but preferable fibers have the fiber diameters ranging from 1 to 50 $\mu$m (more preferably, from 3 to 30 $\mu$m) and the lengths ranging from 3 to 50 mm (more preferably, from 5 to 50 mm). Among these reinforcing fibers, the glass fibers are especially advantageously used because they can achieve high sound absorption and reinforcement effects at low cost.

The matrix resin for producing the fiber-reinforced thermoplastic resin expanded body may be any one of the thermoplastic resins normally used for the extrusion molding, injection molding, press molding, injection compression molding, and so on. Specific examples of such resins include the ordinary thermoplastic resins such as polyolefins (for example, polyethylene and polypropylene), polystyrene, acrylonitrile-styrene-butadiene copolymer, polyvinyl chloride, polyamide, polycarbonate, polyethylene terephthalate, polybutylene terephthalate, polyphenylene ether and styrene-acrylonitrile copolymer; thermoplastic elastomers; modifications thereof; mixtures thereof; and polymer alloys using these thermoplastic resins. The resins may optionally contain various formulation ingredients normally formulated, such as a stabilizer, a pigment or a filler.

Figure 16:
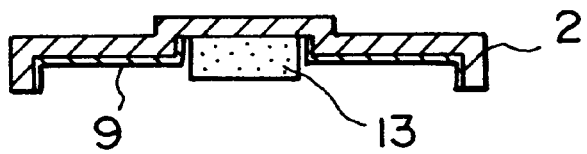
FIG. 16 and FIG. 17 are sectional views of still other examples of the sound absorbing component of the present invention, respectively.

The fiber-reinforced thermoplastic resin expanded body (2) so arranged may be used as a core/sound absorbing portion as it is, or a film layer (9) may be placed (or bonded) on at least a part of the surface of the expanded body, as shown in FIG. 16, in order to prevent absorption of oil or water, so as to prevent degradation of the sound absorbing property, and also to improve the strength.

A material for the film used for such a purpose is preferably a resin of a structure identical with or similar to the matrix resin of the resin expanded body, taking account of adhesion to the fiber-reinforced thermoplastic resin expanded body, but it may be another material if it has good adhesion or a laminate product thereof with another material, which may be properly selected depending upon a purpose of application.

There is no specific limitation on the thickness of the film layer (9) as long as the thickness is sufficient to attain the above effect. Although it depends upon the material, application place, and so on, the preferable range of the thickness is approximately between 20 and 100 $\mu$m, because a too thick film layer would degrade the sound absorbing characteristics (especially, on the higher frequency side).

The thermoplastic resin foamed body (13) integrally stacked on a part of such a fiber-reinforced thermoplastic resin expanded body (2) and going to be a second sound absorbing portion is one of foamed bodies of the thermoplastic resins usually used, for example, foamed bodies of polyethylene, polypropylene, polystyrene, polyurethane, and so on, among which a suitable foamed body is selected according to the sound absorbing property required. Preferred foamed bodies are those of resins of the same kind as or of a similar structure to the matrix resin of the fiber-reinforced thermoplastic resin expanded body to become the core/sound absorbing portion from the aspects of adhesion and molding.

The thermoplastic resin foamed body is usually made by subjecting a thermoplastic resin containing a foaming agent to foaming. If the foamed body used has cells isolated or not communicating with each other, the sound absorbing property is enhanced, especially, in the lower frequency region. Ordinary production processes of the foamed body include the atmospheric foaming process, the foaming process under pressure, the extrusion foaming process, and the beads foaming process. The thermoplastic resin foamed bodies produced by the beads foaming process among the foregoing processes are preferably applicable from the aspects of easiness of molding, freedom degrees of shape, controllability of foaming ratio, and so on.

The foaming ratio is suitably selected according to the sound absorbing property required, and preferred foaming ratios range approximately from 10 to 50 times. Generally speaking, foamed bodies of high foaming ratios are light in weight and excellent in the sound absorbing effect. As the thickness of the thermoplastic resin foamed body (13) increases, the sound absorbing performance is further enhanced. Thus, the thickness is preferably not less than 10 mm. On the other hand, since a too thick thermoplastic resin foamed body (13) would increase the size of the sound absorbing component to make it difficult to place the component around the automobile engine or the like, the thickness is preferably not more than 50 mm.

In the second sound absorbing component of the present invention, the configuration of the sound absorbing component itself is suitably selected according to the application circumstance of the sound absorbing component and no specific limitation is imposed thereon as long as it owns the essential construction of the present invention as described above. Depending upon the operation conditions of the sound absorbing component, the thermoplastic resin foamed body (13) may be concentrated on a part of the fiber-reinforced thermoplastic resin expanded body (2) being the core/sound absorbing portion or partially separated on one or two or more portions thereof. Each of these is designed in the shape and size suitable for use as a sound absorbing component so as to achieve the maximum sound absorbing effect within the shape available in relation with the other components.

At all events, the second sound absorbing component of the present invention is arranged in such a manner that the thermoplastic resin foamed body (13) is placed on a part or parts of the fiber-reinforced thermoplastic resin expanded body (2), thereby effectively absorbing both the sound in the wavelength region effectively absorbed by the fiber-reinforced thermoplastic resin expanded body and the sound in the wavelength region effectively absorbed by the thermoplastic resin foamed body. Since such a thermoplastic resin foamed body (13) is excellent in the sound absorbing characteristics of the sound in the lower frequency region, the sound can be effectively absorbed in the frequency region of 500 to 3000 Hz even if the thickness of the fiber-reinforced thermoplastic resin expanded body (2) is as thin as about 5 to 30 mm. In order to achieve this effect with efficiency, the thermoplastic resin foamed body (13) is preferably placed in the region of 30 to 70% of one surface of the fiber-reinforced thermoplastic resin expanded body (2).

A plurality of thermoplastic resin foamed bodies of a same kind or of different kinds may be properly arranged in combination in a same sound absorbing component. Further, the surface of the thermoplastic resin foamed body may have fine bumps in order to enhance the sound absorbing effect more, and the thermoplastic resin foamed body may be provided with through holes (14), such as round holes, communicating with the bonding surface of the fiber-reinforced thermoplastic resin expanded body in order to attain heat radiation or the like of the core/sound absorbing portion (FIG. 12).

Figure 17:
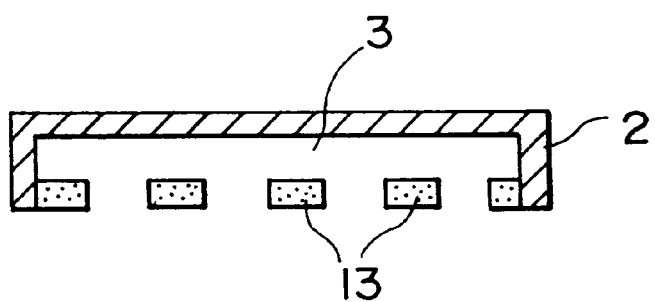

Further, as shown in FIG. 17, the air layer (3) may be provided between the fiber-reinforced thermoplastic resin expanded body (2) and the thermoplastic resin foamed body (13), thereby also achieving the sound absorbing effect by the air layer as discussed previously.

The sound absorbing component of the present invention is constructed in such an arrangement that the thermoplastic resin foamed body is integrally stacked on a part or parts of the fiber-reinforced thermoplastic resin expanded body, and the production process thereof is arbitrary. For example, the fiber-reinforced thermoplastic resin expanded body and thermoplastic resin foamed body each molded in respective shapes are united by an adhesive or a double-sided adhesive tape so as to be in a desired shape, or the thermoplastic resin foamed body preliminarily molded may be thermally bonded to the fiber-reinforced thermoplastic resin expanded body becoming the core portion in an incorporated form at the same time as molding of the fiber-reinforced thermoplastic resin expanded body.

The latter method is advantageous in practice, because the adhesion step as an independent step is omitted and the thermoplastic resin foamed body is integrally bonded at the same time as molding of the fiber-reinforced thermoplastic resin expanded body. For example, when the matrix resin of the fiber-reinforced thermoplastic resin sheet is a polypropylene resin and the thermoplastic resin foamed body is a polypropylene beads foamed body, very excellent adhesion can be attained.

This method is generally carried out substantially in the same manner as in the case for producing the foregoing fiber-reinforced thermoplastic resin expanded body except that the molds employed are female and male molds having a recessed portion capable of receiving the thermoplastic resin foamed body at a predetermined position in either one or in the both of the cavity faces and the thermoplastic resin foamed body is preliminarily set in the recessed portion.

This production example will be explained more specifically.

The molds used in this process are composed of two female and male molds, female mold (5) and male mold (4), as exemplified in FIG. 13, and at least one of these molds is movable in directions to open and close the molds so as to effect mold closing and mold opening.

The molds are designed so as to match with the shape of the desired core/sound absorbing portion, and either one or the both of the cavity faces of the two female and male molds are provided with a recessed portion (15) for receiving the thermoplastic resin foamed body. One or two or more recessed portions are provided in correspondence to the shape, the number, and the size of the thermoplastic resin foamed body. An opening portion of the cavity face of each recessed portion is equal to or a little larger than the adhesion surface of the thermoplastic resin foamed body with the core/sound absorbing portion, and the thermoplastic resin foamed body set in the recessed portion is firmly fit or fixed in the recessed portion, preferably.

Figure 14:
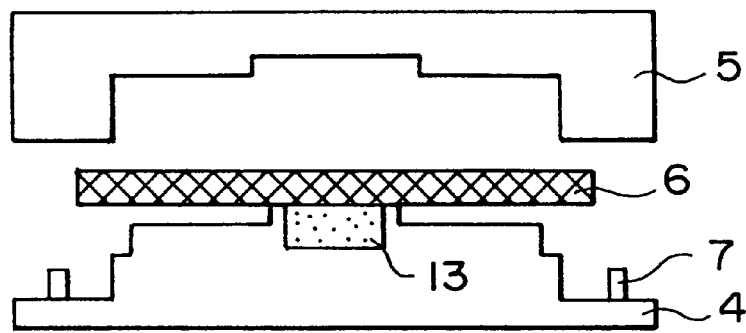
FIG. 14 and FIG. 15 are schematic sectional views of molds to show production steps in an example of production of the sound absorbing component, respectively.
Figure 15:
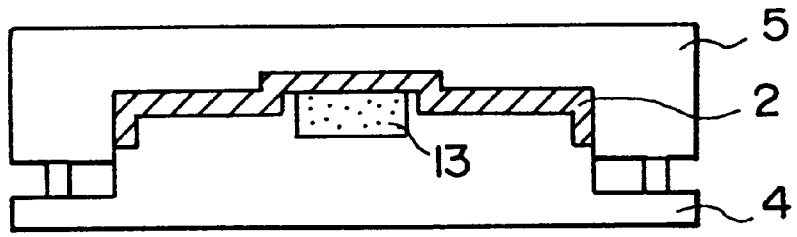

In the first step of this process, a fiber-reinforced thermoplastic resin sheet is pre-heated in the far-infrared heating furnace or the like to expand up to the void percentage of not less than 50 vol %, the expanded fiber-reinforced thermoplastic resin sheet (6) thus having expanded is supplied to between the two female and male molds in an open state while maintaining the pre-heat state, and the thermoplastic resin foamed body (13) preliminarily molded in a desired shape is also supplied into the recessed portion (15) of the mold (FIG. 14).

Either one of them may be supplied first, but the thermoplastic resin foamed body is preferably first supplied in view of maintaining the pre-heat state of the expanded fiber-reinforced thermoplastic resin sheet.

On this occasion, the fiber-reinforced thermoplastic resin sheet is preferably made to expand up to the percentage of voids of not less than 80 vol %. Further, in order to enhance the adhesive force, the thermoplastic resin foamed body is preferably shaped so that the upper end face thereof becoming the adhesion surface to the resin expanded body may be equal to or a little higher than the cavity face when the foamed body is set in the recessed portion.

In the second step, after supply of the expanded fiber-reinforced thermoplastic resin sheet and the thermoplastic resin foamed body in the previous step, the molds are closed to a predetermined cavity clearance quickly enough not to cool the sheet, thereby thermally bonding the resin expanded body with the thermoplastic foamed body into a united form at the same time as molding to shape the papermaking-method fiber-reinforced thermoplastic resin expanded body.

On this occasion, for example, by adjusting the height of the stopper (7) provided outside the outer periphery of the male mold, the cavity clearance at the end of mold closing can be adjusted so as to attain the desired percentage of voids of not less than 50 vol %. If it is of a complex shape or of a deeply drawn shape, the expanded fiber-reinforced thermoplastic resin sheet (6) may wrinkle or break in the molding process. Thus, it is effective to hold the sheet by a clamp frame or the like during supply of the sheet.

If the matrix resins of the thermoplastic resin foamed body and fiber-reinforced thermoplastic resin expanded body are resins of a same kind or of similar structure or resins exhibiting good adhesion by thermal bonding, they are easily thermally bonded to each other by the heat of the expanded fiber-reinforced thermoplastic resin sheet preheated. However, if they have low thermal bonding property, for example, when they are different resins, or when the thermoplastic resin foamed body is different from a resin of the outermost layer of a film preliminarily bonded to the surface of the expanded fiber-reinforced thermoplastic resin sheet, a pre-treatment is necessary, for example, such as a pre-treatment of applying a hot melt adhesive to the adhesion surfaces of them.

The above process can readily produce the sound absorbing component in which the thermoplastic resin foamed body is integrally bonded at the desired position on the fiber-reinforced thermoplastic resin expanded body having the percentage of voids being not less than 50 vol %.

The foregoing explained the preferred embodiments of the first and second sound absorbing components of the present invention, but it is noted that the sound absorbing component of the present invention is not limited to the above embodiments.

For example, another embodiment may be arranged so that the void percentage of the fiber-reinforced thermoplastic resin expanded body in the sound absorbing component is not less than 85 vol % and the sound absorbing component further has a support portion comprised of a second fiber-reinforced thermoplastic resin expanded body having the percentage of voids being less than 50 vol %. This embodiment will be explained in the following.

Figure 18:
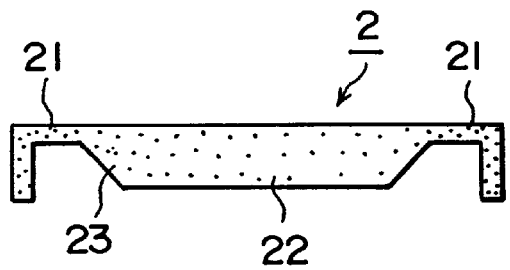
FIG. 18 to FIG. 20 are sectional views of other examples of the fiber-reinforced thermoplastic resin expanded body according to the present invention, respectively.
Figure 19:
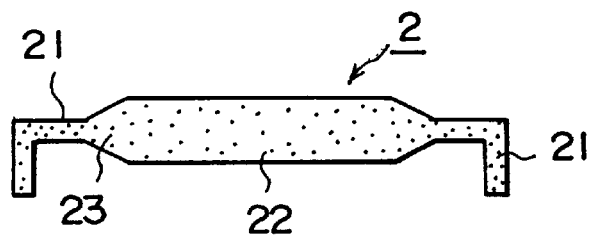

FIG. 18 and FIG. 19 are sectional views to show examples of the fiber-reinforced thermoplastic resin expanded body according to this embodiment. The fiber-reinforced thermoplastic resin expanded body (2) in these examples has portions made of a fiber-reinforced thermoplastic resin, which are portion (21) having the percentage of voids being not more than 50 vol % and portion (22) having the percentage of voids being not less than 85 vol %, as being integrally constructed. The portion (21) with the percentage of voids being not more than 50 vol % (hereinafter referred to as a support portion (core member)) functions mainly to maintain the stiffness as a sound absorbing component and the portion (22) with the percentage of voids being not less than 85 vol % (hereinafter referred to as a sound absorbing portion) functions mainly to achieve the sound absorbing performance.

Figure 20:
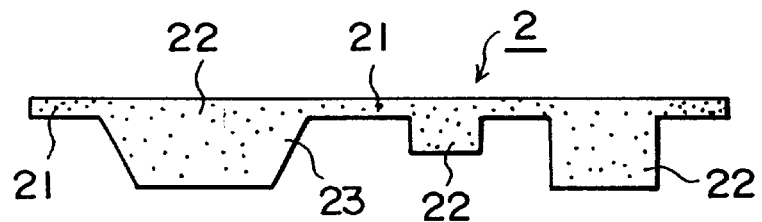

FIG. 18 and FIG. 19 show the examples in which the support portion (21) and the sound absorbing portion (22) are connected in a continuous manner and in a non-adhesive manner as continuously changing the void percentages. Connection portions (23) have an intermediate function between the support portion and the sound absorbing portion, and they approach the function as a sound absorbing portion with an increase of the void percentage while approaching the function as a support portion with a decrease of the void percentage. It is also needless to mention that a plurality of support portions (21) or sound absorbing portions (22) may be provided in a same resin expanded body (2), as shown in FIG. 20, and the sound absorbing portions and support portions may be arranged adjacent to each other. Further, the void percentages of these plural support portions and sound absorbing portions may partially differ within the above ranges. In addition, a sound absorbing component may include an independently existing intermediate void portion (23) having an intermediate void percentage over 50 vol % and below 85 vol %, for example from the point of mounting of the component.

Even though either structure is adopted, such a resin expanded body (2) is most preferably constructed integrally of a same material, including the support portion, sound absorbing portion, and other portions, without adhesion of these portions from the aspect of production and strength.

In the fiber-reinforced thermoplastic resin expanded body (2) according to the present invention, the support portion (21) may have the sound absorbing effect in some cases depending upon the percentage of void thereof, but it should mainly retains the shape of the sound absorbing component and can be a mounting portion to another product or member. Accordingly, in order to avoid bending or tearing thereof, the void percentage needs to be not more than 50 vol % so as to raise the bending and tensile strength. There is no specific limitation on the lower limit, which may be 0%. However, the lower limit is preferably in the range of 20 to 50 vol %.

Since the sound absorbing portion (22) attains the sound absorbing effect by vibration of fibers while decreasing joining points between the reinforcing fibers in the material and weakening the restraint on the fibers, the percentage of voids is preferably not less than 85 vol %. However, if the percentage of voids were too high, the restraint force on the fibers would become zero or too weak, which would make the strength too low and make it difficult to maintain the shape. Thus, the upper limit is properly determined depending upon the operating conditions as a sound absorbing component, the properties of the fiber-reinforced thermoplastic resin as a raw material, and so on, and is generally 95 vol %.

The fiber-reinforced thermoplastic resin expanded body (2) of this embodiment can be produced by various processes, and it can be readily produced by the expansion molding process of the fiber-reinforced thermoplastic resin sheet obtained by a papermaking method, as described previously. This process permits the resin expanded body having the portions of different void percentages to be produced in one step from a single raw material and as an integral product without any adhesion portion to another material.

The expansion molding process of the fiber-reinforced thermoplastic resin sheet is a process for pre-heating the fiber-reinforced thermoplastic resin sheet as a raw material to above the melting point of the thermoplastic resin as a matrix material to expand it in the thickwise direction, and thereafter compressing it to shape it into a desired shape. The fiber-reinforced thermoplastic resin expanded body (2) of this embodiment can be made utilizing such an expansion molding process to partially change compression rates of the fiber-reinforced thermoplastic resin sheet expanded by pre-heating, thereby molding it so as to simultaneously have both the sound absorbing portion with high percentage of void (at low compression rate) and the support portion with low percentage of void (at high compression rate).

Therefore, the fiber-reinforced thermoplastic resin sheet being the raw material needs to be pre-heated to expand before the percentage of voids becomes over the percentage of void to be owned by the sound absorbing portion in the resin expanded body being a product, that is, before the percentage of voids becomes not less than 85 vol %. This percentage of voids can be achieved mainly by adjusting a filling rate (content) of reinforcing fibers in producing the fiber-reinforced thermoplastic resin sheet, the fiber lengths, fiber diameters, flexural rigidity of fiber themselves, orientation of fibers, and so on.

For example, in the case wherein the matrix resin is polypropylene, the reinforcing fibers are glass fibers, and the content of glass fibers is approximately 55 to 65 wt %, the percentage of voids obtained by expansion upon pre-heating can be raised up to above 85 vol % by adjusting the split rate and fiber orientation of the glass fibers in the thickwise direction of the sheet.

By simply increasing the content of the glass fibers, the expansion rate upon pre-heating can be raised so as to increase the percentage of voids, but the matrix resin is less in this case so as to decrease joining portions of the resin between the fibers too much, thereby lowering the strength considerably, especially lowering the flexural rigidity at the support portion with the void percentage being not more than 50 vol %, and thus making it difficult to maintain the shape as a sound absorbing component.

Therefore, in order to secure the sound absorbing effect and the strength as a sound absorbing component, the content of the glass fibers needs to be not more than 80 wt %, preferably not more than 65 wt %, thereby meeting the two requirements, the expansion property upon pre-heating of the fiber-reinforced thermoplastic resin sheet and the rigidity in the support portion with the void percentage being not more than 50 vol % as a sound absorbing component.

Next described is an example of production of the fiber-reinforced thermoplastic resin expanded body (2) of this embodiment by such expansion molding.

Figure 21:
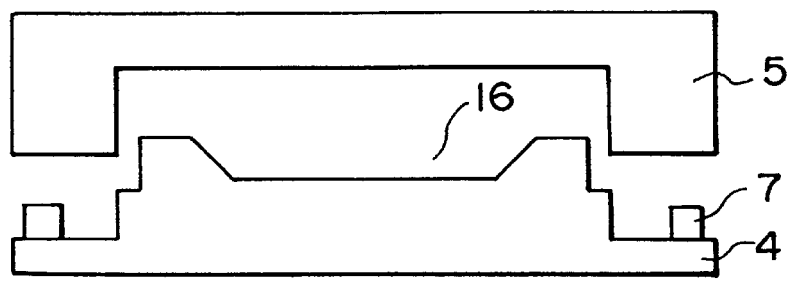
FIG. 21 is a schematic sectional view of still another example of molds used for the present invention.

For example, for producing the resin expanded body as shown in FIG. 18, a pair of female and male molds, female mold (5) and male mold (4) as exemplified in FIG. 21, are used, the female mold (5) is arranged as vertically movable so as to effect mold closing and mold opening, and these molds are made in a stereoscopic shape corresponding to the shape of product.

Figure 22:
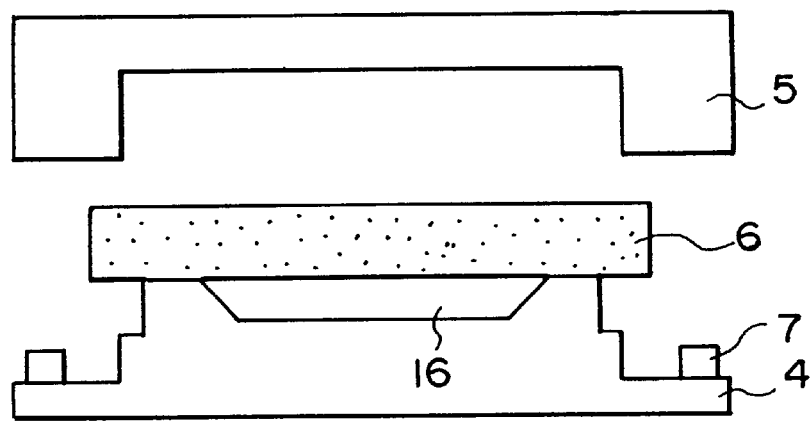
FIG. 22 and FIG. 23 are schematic sectional views of molds to show production steps in an example of production of the fiber-reinforced thermoplastic resin expanded body, respectively.

Such upper and lower molds are kept in an open state, the fiber-reinforced thermoplastic resin sheet (6) is pre-heated to a temperature higher than the melting point and lower than the decomposition point of the thermoplastic resin as a matrix resin in the far-infrared heating furnace to expand by the spring back force of reinforcing fibers up to the percentage of voids being not less than 85 vol %, and the fiber-reinforced thermoplastic resin sheet (6) having expanded is supplied to between the two molds as maintaining the pre-heated state (FIG. 22).

Figure 23:
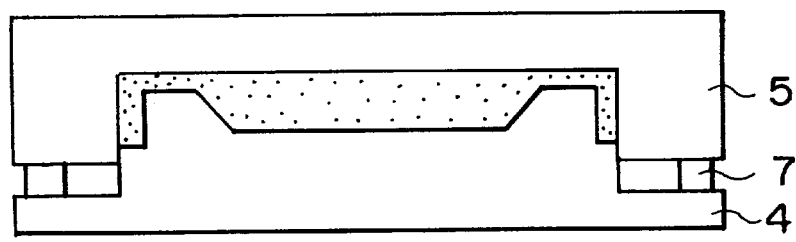

Immediately after that, the female mold (5) is moved down to close the molds so that the percentage of voids of the support portion (21) may be not more than 50 vol % and the percentage of voids of the sound absorbing portion (22) may be not less than 85 vol %, thereby shaping the sheet into the desired shape of the sound absorbing component (FIG. 23).

At this time it is necessary that, after completion of mold closing, the void percentage of the portion corresponding to the supporting portion (21) be not more than 50 vol % and that the void percentage of the portion (the portion inside the recessed portion (16) formed in the mold in the drawing) corresponding to the sound absorbing portion (22) be not less than 85 vol %. For that, for example, when a predetermined cavity clearance is achieved at the portion to form the supporting portion (21), the depth of the mold recessed portion (16) corresponding to the sound absorbing portion needs to be adjusted in a good balance so as to attain the void percentage of not less than 85 vol % in the sound absorbing portion (22), thus differentiating the compression rates in the supporting portion and in the sound absorbing portion from each other. Such a cavity clearance after completion of mold closing can be controlled by any method, and for example, it can be arbitrarily adjusted by changing the height of the stopper (7) provided in the outer periphery of the male mold, as a simple method.

Figure 24:
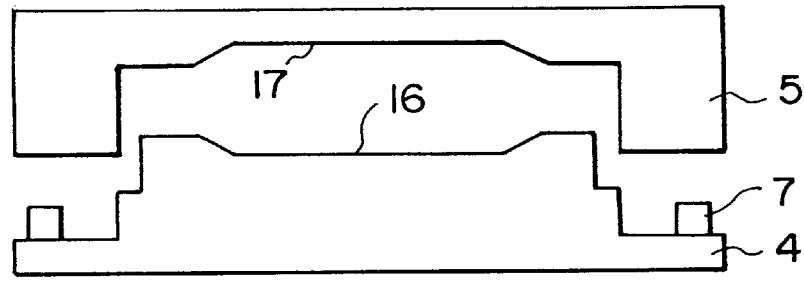
FIG. 24 is a sectional view of still another example of the fiber-reinforced thermoplastic resin expanded body according to the present invention.

For producing the fiber-reinforced thermoplastic resin expanded body (2) as shown in FIG. 19, the molds used may be those having a recessed portion (17), corresponding to the recessed portion (16) of the male mold, also in the mold surface of the female mold (5), as exemplified in FIG. 24.

Thus, the fiber-reinforced thermoplastic resin sheet expanded by pre-heating up to a void percentage of not less than 85 vol % is compressed strong enough for the void percentage in the supporting portion (21) to be not more than 50 vol % and weak enough for the void percentage in the sound absorbing portion (22) not to be less than 85 vol %, thereby obtaining the sound absorbing component simultaneously and integrally having the supporting portion with the void percentage of not more than 50 vol % and the sound absorbing portion with the void percentage of not less than 85 vol %.

The process for producing the fiber-reinforced thermoplastic resin sheet is not limited to a papermaking method, but it may be a laminate method. Here, the laminate method is a method for obtaining the fiber-reinforced thermoplastic resin sheet by stacking a thermoplastic resin and mat-like strand reinforcing fibers entangled with each other by piercing a plurality of strand-like reinforcing fiber bundles with needles, and then heating and pressing them into a sheet.

EXAMPLES

The present invention will be described in further detail with examples, but it is noted that the invention is by no means limited thereby.

Example 1

The fiber-reinforced thermoplastic resin expanded body being the sound absorbing portion was produced by the following process, using the pair of upper and lower molds as shown in FIG. 6.

A papermaking-method fiber-reinforced thermoplastic resin sheet (available from K-Plasheet Corporation, content of glass fibers (average fiber diameter: 15 $\mu$m): 45 wt %, weight per unit area: 1200 g/m$^2$) approximately 1 mm thick comprised of polypropylene and glass fibers was pre-heated at 210° C. in the far-infrared heating furnace to expand, thereby obtaining an expanded sheet approximately 5 mm thick having the void percentage of 80 vol %.

The expanded sheet in the pre-heated state is supplied to the cavity surface of the lower mold between the two molds in the open state (FIG. 8), immediately thereafter the molds were closed up to the cavity clearance of 3 mm at completion of mold closing to shape the sheet (FIG. 9), the molds were cooled as maintaining this state, and then the molds were opened, thereby obtaining the fiber-reinforced thermoplastic resin expanded body shaped in the predetermined configuration. The cavity clearance at the end of mold closing at this time was controlled by the stopper provided in the peripheral surface of the lower mold.

The fiber-reinforced thermoplastic resin expanded body obtained shrunk approximately 10% in the thickwise direction upon cooling, and it had the void percentage of 65 vol % and the thickness of about 2.7 mm.

On the other hand, a resin molded body comprised of a polypropylene resin to be the core member of the sound absorbing component was molded in the predetermined shape. The fiber-reinforced thermoplastic resin expanded body obtained above was integrally bonded to this resin molded body at the both ends by a hot melt adhesive with a clearance between them so as to make the thickness of the air layer 3 mm, thus obtaining the sound absorbing component as shown in FIG. 1.

The sound absorbing component thus obtained was lightweight as compared with its apparent volume and excellent in the sound absorbing performance.

Comparative Examples 1–3

Fiber-reinforced thermoplastic resin expanded bodies were obtained in the same manner as in Example 1 except that the void percentage of fiber-reinforced thermoplastic resin expanded body was 67 vol % (Comparative Example 1), 80 vol % (Comparative Example 2), or 87 vol % (Comparative Example 3) and the thickness thereof was approximately 10 mm.

Figure 25:
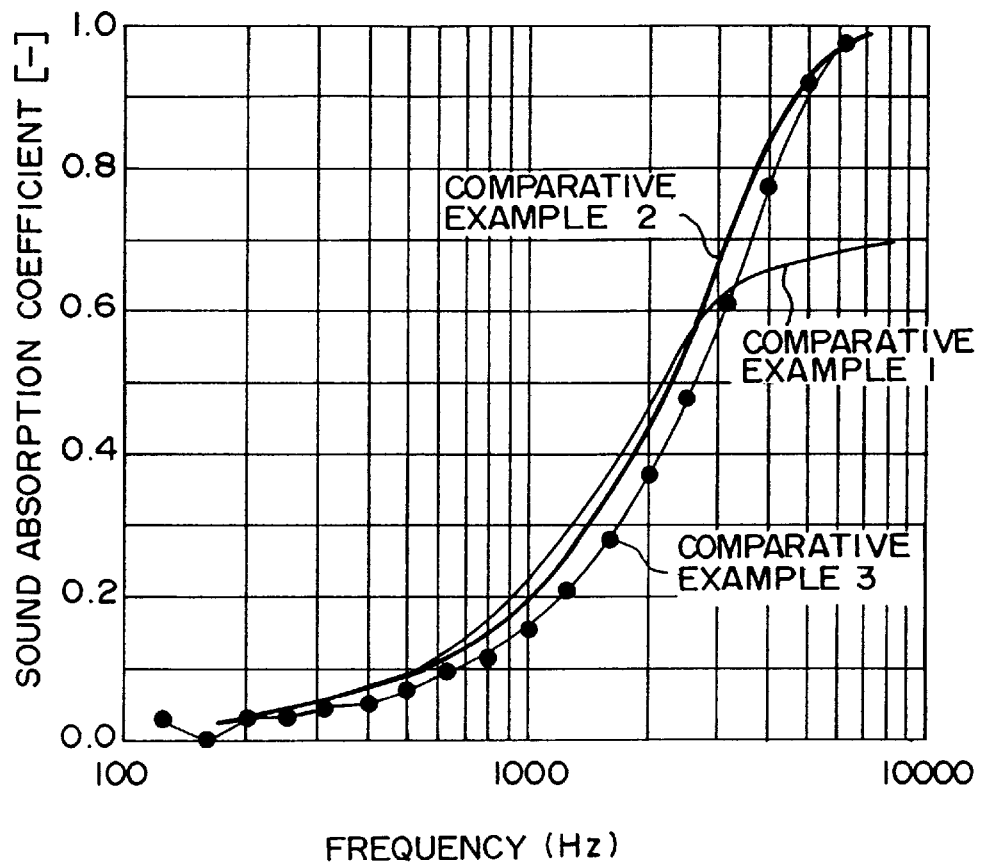
FIG. 25 is a graph to show a relation between percentage of voids and sound absorption coefficient of resin expanded bodies.

Normal (vertical) incident sound absorption coefficients of the fiber-reinforced thermoplastic resin expanded bodies thus obtained were measured in conformity to JIS A 1405, and results of measurement are shown in FIG. 25. It was found from FIG. 25 that the sound absorption coefficient increases as the void percentage increases and particularly, sound absorption coefficients are high over 70 vol %. However, the frequency region of sound effectively absorbed was not shifted even with an increase of the void percentage.

Comparative Examples 4–6

Fiber-reinforced thermoplastic resin expanded bodies were obtained in the same manner as in Example 1 except that the void percentage of fiber-reinforced thermoplastic resin expanded body was 89 vol % and the thickness thereof was 6.9 mm (Comparative Example 4), 13.8 mm (Comparative Example 5), or 20.8 mm (Comparative Example 6).

Figure 26:
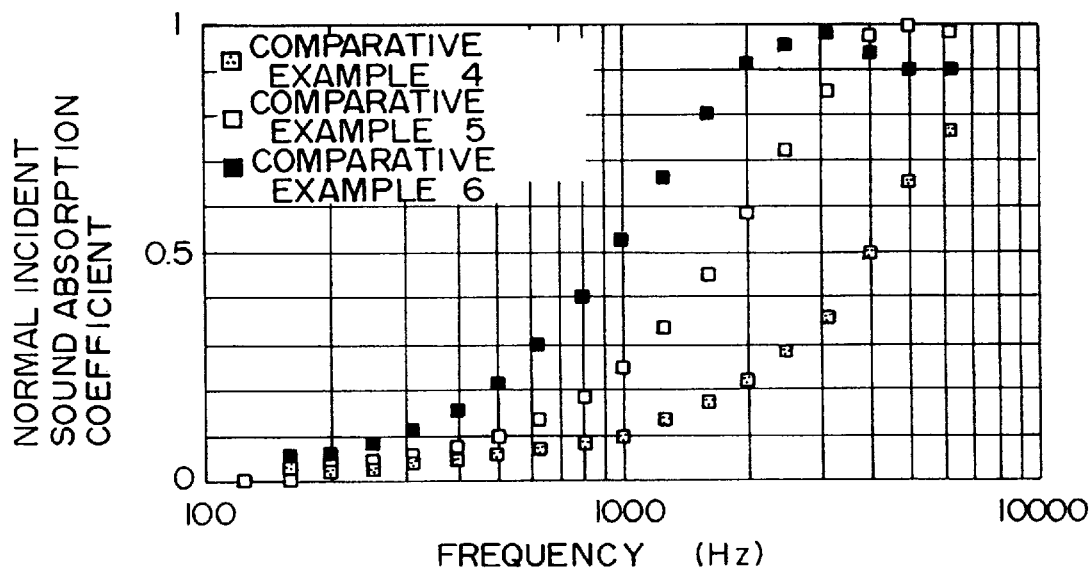
FIG. 26 is a graph to show a relation between thickness and sound absorption coefficient of resin expanded bodies.

Normal incident sound absorption coefficients of the fiber-reinforced thermoplastic resin expanded bodies thus obtained were measured in conformity to JIS A 1405, and results of measurement are shown in FIG. 26. It is apparent from FIG. 26 that the frequency region of sound effectively absorbed is shifted to the lower frequency side with an increase of the thickness of resin expanded body. The thickness over 21 mm considered necessary in order to absorb the sound in the frequency region of 500 to 3000 Hz more effectively, but it was against compact and lightweight properties required for the sound absorbing component.

Examples 2–6 and Comparative Example 7

Sound absorbing components were obtained in the same manner as in Example 1 except that the void percentage of fiber-reinforced thermoplastic resin expanded body was 80 vol %, the thickness thereof was 10 mm, and the thickness of the air layer was 0 mm (Comparative Example 7), 5 mm (Example 2), 10 mm (Example 3), 15 mm (Example 4), 20 mm (Example 5), or 25 mm (Example 6).

Figure 27:
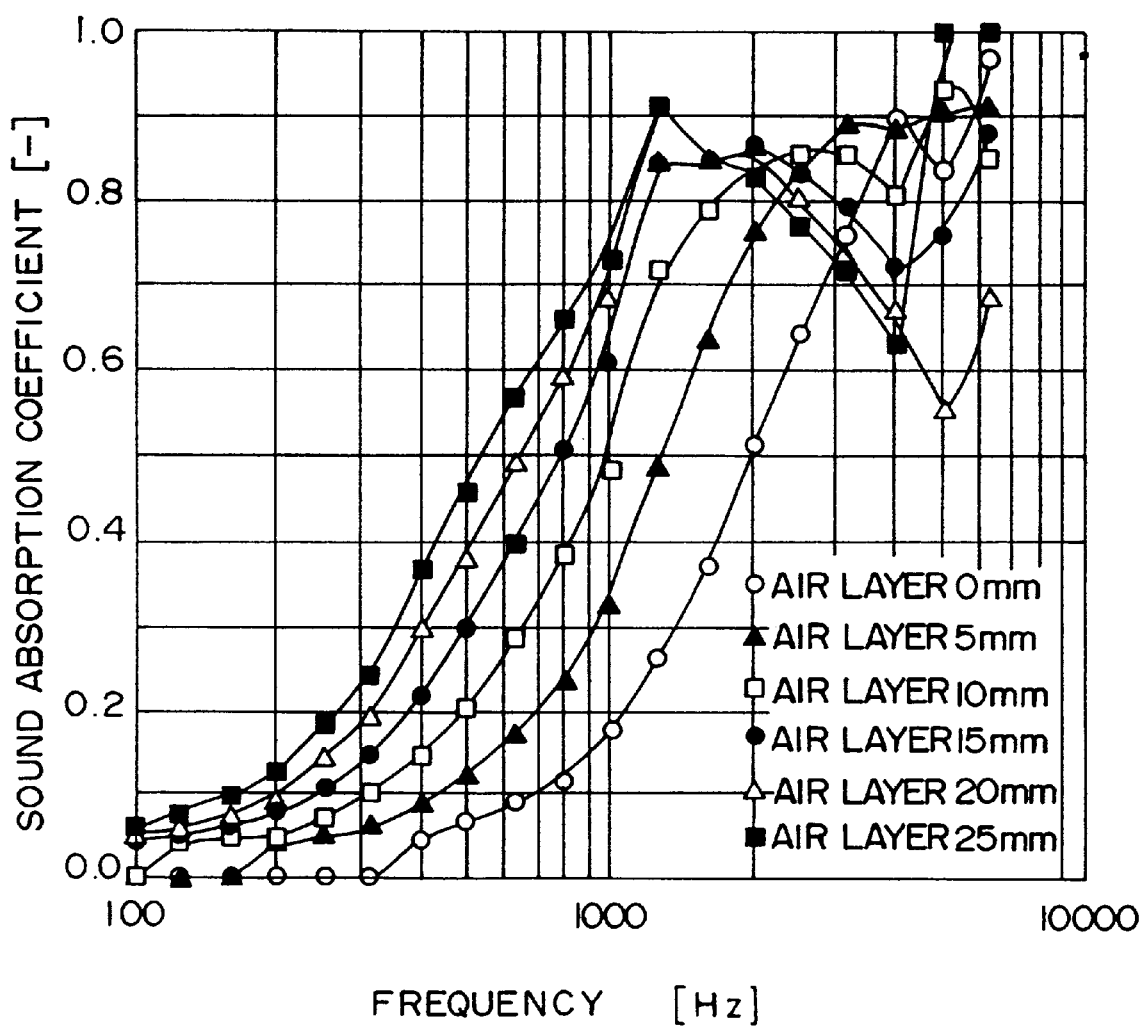
FIG. 27 is a graph to show a relation between thickness and sound absorption coefficient of air layers between the resin expanded body and the resin molded body.

Normal incident sound absorption coefficients of the sound absorbing components thus obtained were measured in conformity to JIS A 1405, and results of measurement are shown in FIG. 27. It is apparent from FIG. 27 that the frequency region of sound effectively absorbed is shifted to the lower frequency side with an increase of the thickness of the air layer and, especially, when the thickness of the air layer is over 10 mm, the sound is effectively absorbed in the frequency region of 500 to 3000 Hz even though the thickness of resin expanded body is 10 mm.

Examples 7–9 and Comparative Example 8

Sound absorbing components were obtained in the same manner as in Example 1 except that the void percentage of fiber-reinforced thermoplastic resin expanded body was 76 vol %, the thickness thereof was 5 mm, and the thickness of the air layer was 0 mm (Comparative Example 8), 5 mm (Example 7), 10 mm (Example 8), or 15 mm (Example 9).

Figure 28:
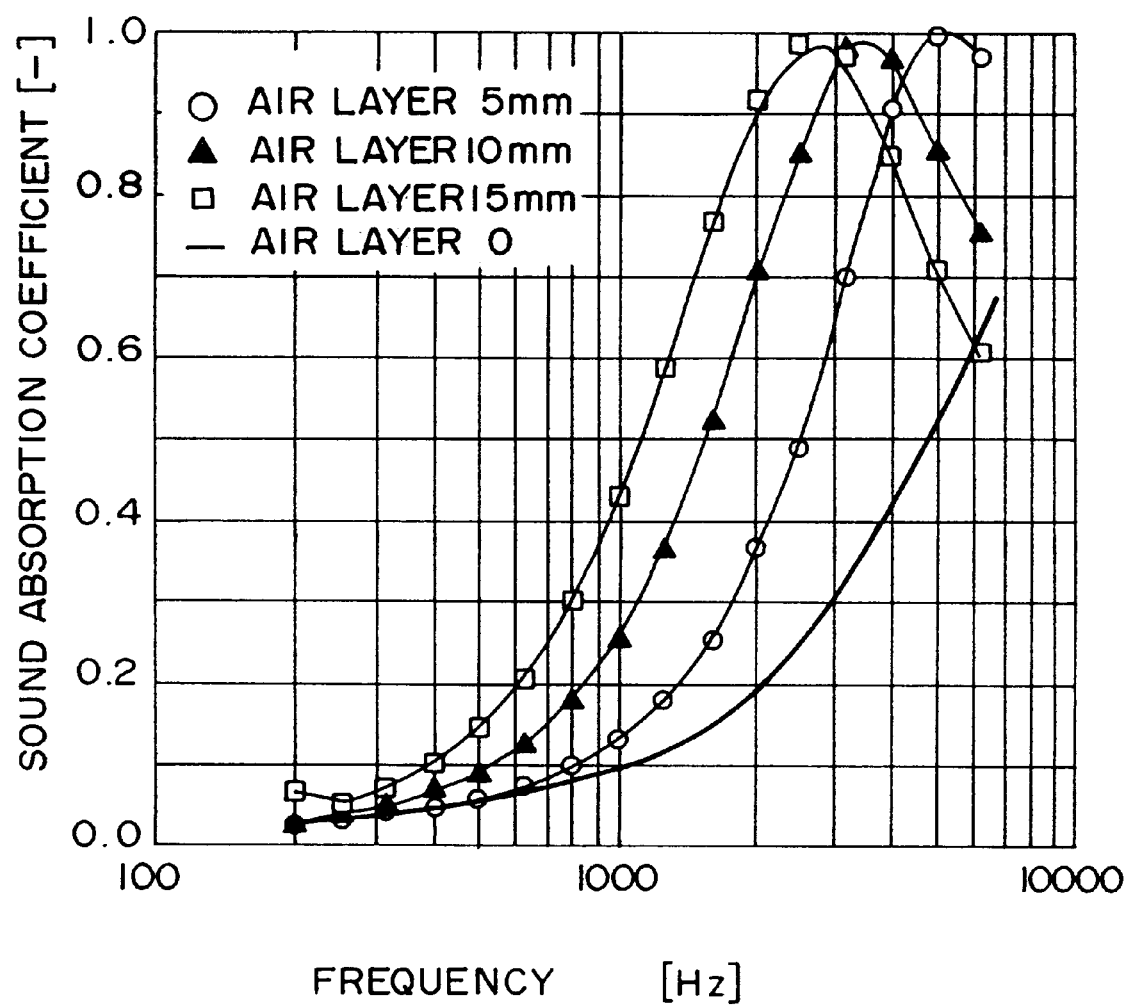
FIG. 28 is a graph to show a relation between thickness and sound absorption coefficient of air layers between the resin expanded body and the resin molded body.

Normal incident sound absorption coefficients of the sound absorbing components thus obtained were measured in conformity to JIS A 1405, and results of measurement are shown in FIG. 28. It is also apparent from FIG. 28 that the frequency region of sound effectively absorbed is shifted to the lower frequency side with an increase of the thickness of the air layer and, especially, when the thickness of the air layer reaches 15 mm, the sound comes to be effectively absorbed in the frequency region of 500 to 3000 Hz even though the thickness of resin expanded body is 5 mm.

Examples 10–12

Sound absorbing components were obtained in the same manner as in Example 1 except that the void percentage of fiber-reinforced thermoplastic resin expanded body was 80 vol %, the total thickness of resin expanded body and air layer was 20 mm, and a ratio of the thickness of resin expanded body and the thickness of air layer was 4:16 (Example 10), 6:14 (Example 11), or 10:10 mm (Example 12).

Figure 29:
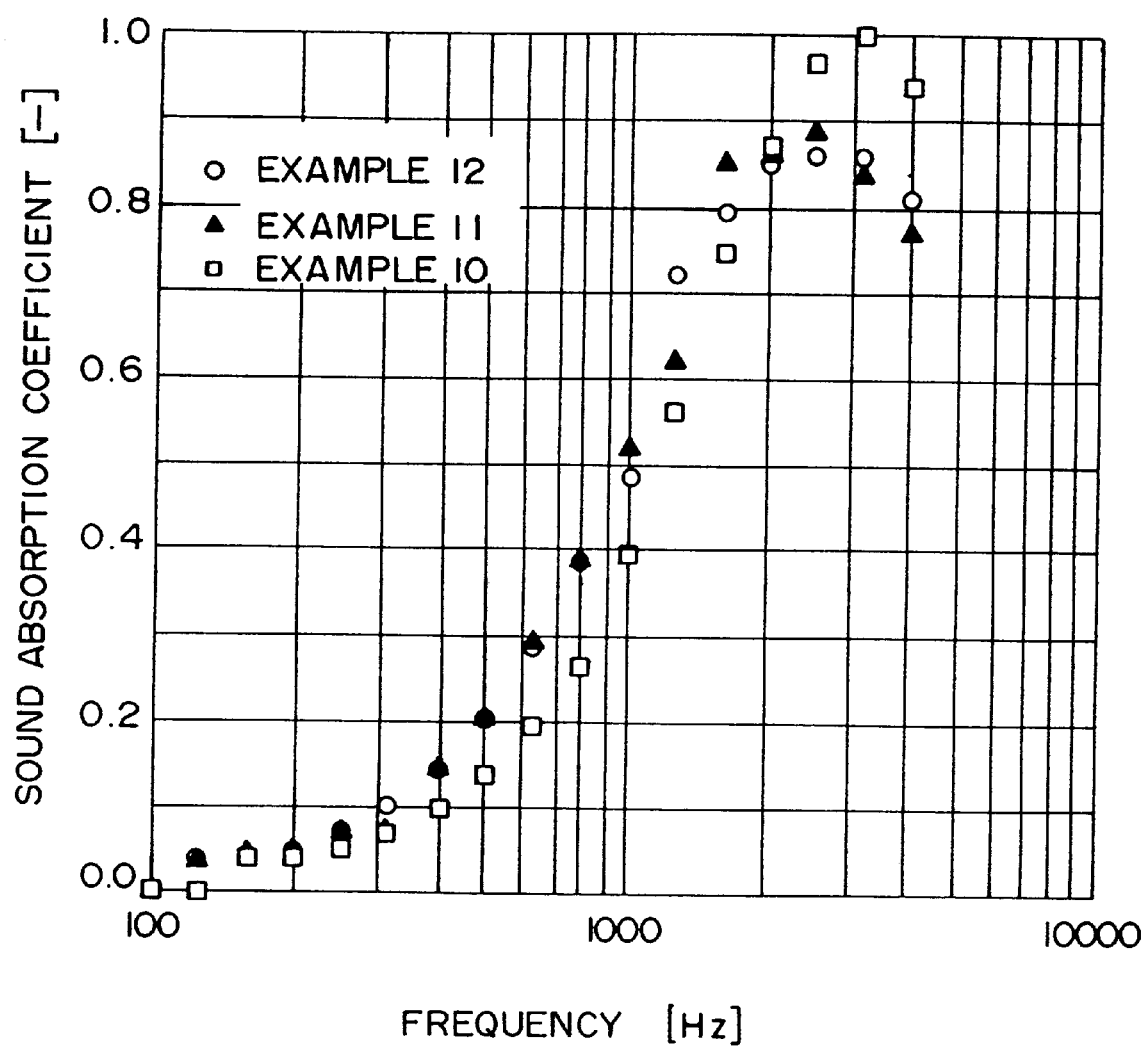
FIG. 29 is a graph to show a relation between sound absorption coefficient and ratio of the thickness of the resin expanded body and the thickness of the air layer.

Normal incident sound absorption coefficients of the sound absorbing components thus obtained were measured in conformity to JIS A 1405, and results of measurement are shown in FIG. 29. It is apparent from FIG. 29 that the sound is effectively absorbed in the frequency region of 500 to 3000 Hz in either example even though the total thickness of resin expanded body and air layer is very thin, 20 mm, and they are lightweight.

Example 13

A fiber-reinforced thermoplastic resin expanded body was obtained according to Example 1, using the same fiber-reinforced thermoplastic resin sheet as that used in Example 1 except that a composite film of polypropylene and nylon 65 μm thick was laminated on one surface thereof.

However, this example used a pair of upper and lower molds of the mold shape shown in FIG. 7, and the center portion of the resin expanded body on the opposite side to the resin molded body was formed in a recessed shape for receiving another component.

The void percentage of the fiber-reinforced thermoplastic resin expanded body obtained was 65 vol % and the thickness thereof was about 2.7 mm.

Figure 2:
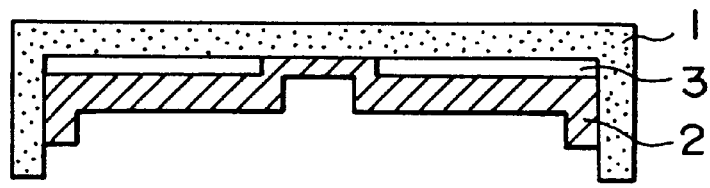

Separately, a resin molded body comprised of a polypropylene resin was molded in the predetermined shape as a core member of sound absorbing component, and the papermaking-method fiber-reinforced thermoplastic resin body obtained above was integrally bonded to this resin molded body at the tip end of the projecting portion and at the both ends by a hot melt adhesive with a clearance so as to make the thickness of the air layer 2 mm, thus obtaining the sound absorbing component as shown in FIG. 2.

The sound absorbing component thus obtained was lightweight as compared with its apparent volume and excellent in the sound absorbing performance, and it was further excellent in water resistance and oil resistance as compared with that of Example 1.

Example 14

A sound absorbing component was produced as uniting the thermoplastic resin foamed body with the fiber-reinforced thermoplastic resin expanded body with the void percentage of 65 vol % by the following process, using the pair of female and male molds as shown in FIG. 13.

A polypropylene beads foamed body (thickness 10 mm, expansion rate of 30 times) molded in the predetermined shape was fit and set in the recessed portion formed in the male mold between the two molds kept in an open state; then an expanded fiber-reinforced thermoplastic resin sheet approximately 5 mm thick having the void percentage of 80 vol %, obtained by pre-heating a papermaking-method fiber-reinforced thermoplastic resin sheet (available from K-Plasheet Corporation, glass fiber content: 45 wt %, weight per unit area: 1200 g/m$^2$) approximately 1 mm thick comprised of polypropylene and glass fibers at 210° C. in the far-infrared heating furnace to expand, was placed on the cavity surface of the male mold as maintaining the pre-heated state of the sheet (FIG. 14).

Immediately after that, the molds were closed to the cavity clearance of 3 mm at completion of mold closing to thermally bond the expanded fiber-reinforced thermoplastic resin sheet with the polypropylene beads foamed body while simultaneously shaping them (FIG. 15), the molds were cooled while maintaining this state, and then the molds were opened, thus obtaining the sound absorbing component in the sectional shape shown in FIG. 11. The cavity clearance at completion of mold closing at this time was controlled by the stopper provided in the outer periphery of the male mold.

The portion of the papermaking-method fiber-reinforced thermoplastic resin expanded body in the sound absorbing component obtained shrunk approximately 10% in the thickwise direction upon cooling so as to be about 2.7 mm thick. The void percentage thereof was 65 vol %. The sound absorbing component was lightweight as compared with its apparent volume, and was excellent in the sound absorbing performance. The portion of the fiber-reinforced thermoplastic resin expanded body contributes to absorption of sound, especially, in the frequency region of 1000 or more Hz and the foamed body to absorption of sound, especially, in the frequency region of 500 to 1000 Hz, so that the total sound absorbing component effectively absorbs the sound in the frequency region of 500 to 3000 Hz.

Example 15

A sound absorbing component of the sectional configuration shown in FIG. 11 was obtained in the same manner as in Example 14 except that a composite film of polypropylene and nylon 65 μm thick was laminated on one surface of the papermaking-method fiber-reinforced thermoplastic resin sheet and a hot melt adhesive film was placed on the top end face (adhesion surface) of the polypropylene beads foamed body.

The portion of the fiber-reinforced thermoplastic resin expanded body of the sound absorbing component obtained had the thickness of about 2.7 mm and the void percentage of 65 vol %, and the sound absorbing component was lightweight as compared with its apparent volume and was also excellent in the sound absorbing performance, and it was further excellent in water resistance and oil resistance as compared with that of Example 14.

Example 16

Produced using the pair of female and male molds shown in FIG. 21 and by the following process according to the steps shown in FIG. 22 and FIG. 23 was a fiber-reinforced thermoplastic resin expanded body having the supporting portion with the void percentage being 45 vol % and the sound absorbing portion with the void percentage being 89 vol % in the sectional configuration shown in FIG. 18.

A papermaking-method fiber-reinforced thermoplastic resin sheet containing the matrix resin of polypropylene and the reinforcing fibers of glass fibers (available from K-Plasheet Corporation, glass fiber content: 60 wt %, high split degree, fiber orientation adjusted) was pre-heated at a temperature over the melting point of the matrix resin in the far-infrared heating furnace to expand up to the void percentage of 90 vol %, and this expanded papermaking-method fiber-reinforced thermoplastic resin sheet was placed on the cavity surface of the male mold as maintaining the pre-heated state (FIG. 22).

Immediately after that, the female mold was moved down to close the molds, thereby shaping the sheet in the cavity configuration (FIG. 23). Upon mold closing the cavity clearance of the portion corresponding to the supporting portion at completion of mold closing became 2.2 mm by the stopper provided in the outer peripheral portion of the male mold. The depth of the recessed portion of mold was adjusted so that the cavity clearance in the recessed portion of mold corresponding to the sound absorbing portion at this time became 11.5 mm.

After mold closing, the molds were cooled as maintaining this state, and then the molds were opened. The molded product as a fiber-reinforced thermoplastic resin expanded body was then taken out. The fiber-reinforced thermoplastic resin expanded body taken out shrunk a little after that, so that it finally had the supporting portion having the thickness of 2.1 mm and the void percentage of 45 vol % and the sound absorbing portion having the thickness of about 10.4 mm and the void percentage of 89 vol %. The final product had sufficient strength, was lightweight, and showed excellent sound absorbing performance.

Example 17

A fiber-reinforced thermoplastic resin expanded body was produced in the same manner as in Example 16 except that the fiber-reinforced thermoplastic resin sheet was a sheet in which a composite film 65 μm thick comprised of polypropylene and nylon was laminated on one surface of the same papermaking-method fiber-reinforced thermoplastic resin sheet as that used in Example 16 and it was placed on the lower mold with the film layer in contact with the lower mold surface. The resin expanded body obtained consisted of the supporting portion having the thickness of 2.1 mm and the void percentage of 42.5 vol % and the sound absorbing portion having the thickness of about 10.4 mm and the void percentage of 88.4 vol %, and the film was stacked over the entire surface on the sound absorbing portion side. The sound absorbing component had sufficient strength, was lightweight, and showed excellent sound absorbing performance.

Industrial Applicability

The sound absorbing components of the present invention can be readily produced not only in the cases of relatively large scale of course, but also as compact sound absorbing components, and they are excellent in the sound absorbing performance even if light and thin. The present invention thus provides the sound absorbing components that can effectively absorb the sound in the frequency range of 500 to 3000 Hz, corresponding to the exterior noise especially problematic in automobiles, even if they are light and thin.

What we claim is:

1. A sound absorbing component comprising a fiber-reinforced thermoplastic resin expanded body having a percentage of voids being 70 to 95 volume percent, and a thickness of 2 to 30 mm, and a resin molded body, an air layer being provided between said fiber-reinforced thermoplastic resin expanded body and said resin molded body and having a thickness being 10 to 50 mm.

2. The sound absorbing component according to claim 1, wherein said resin molded body is a thermoplastic resin molded body having substantially no void and said fiber-reinforced thermoplastic resin expanded body is an expanded body resulting from expansion molding of a fiber-reinforced thermoplastic resin sheet obtained by a papermaking method.

3. The sound absorbing component according to claim 1, further comprising a film layer 20 to 100 µm thick, said film layer being placed on at least a part of a surface of said fiber-reinforced thermoplastic resin expanded body on the opposite side to said resin molded body.

4. A sound absorbing component comprising a fiber-reinforced thermoplastic resin expanded body having a percentage of voids being 70 to 95 volume percent and a thickness of 5 to 30 mm, and a thermoplastic resin foamed body having a foaming ratio of 10 to 50 times and a thickness of 10 to 50 mm, said thermoplastic resin foamed body being placed on a part of said fiber-reinforced thermoplastic resin expanded body, an air layer being provided between said fiber-reinforced thermoplastic resin expanded body and said thermoplastic resin foam body.

5. The sound absorbing component according to claim 4, wherein said thermoplastic resin foamed body is a foamed body having isolated cells resulting from foaming of a thermoplastic resin containing a foaming agent and said fiber-reinforced thermoplastic resin expanded body is an expanded body resulting from expansion molding of a fiber-reinforced thermoplastic resin obtained by a papermaking method.

6. The sound absorbing component according to claim 4, further comprising a film layer 20 to 100 µm thick, said film layer being placed on at least a part of a surface of said fiber-reinforced thermoplastic resin expanded body.

7. The sound absorbing component according to claim 1 or claim 4, wherein said thermoplastic resin is a polyolefin and said reinforcing fibers are glass fibers.

8. The sound absorbing component according to claim 1 or claim 4, wherein of said sound absorbing component further comprising a supporting portion comprised of a second fiber-reinforced thermoplastic resin expanded body having a percentage of void being less than 50 vol %.

9. The sound absorbing component according to claim 8, wherein the fiber-reinforced thermoplastic resin expanded body having said supporting portion is produced by a process comprising:

heating a fiber-reinforced thermoplastic resin sheet obtained by a papermaking method to a temperature not lower than a melting point of said thermoplastic resin but lower than a decomposition point thereof, and thereby expanding said sheet by the spring back force of said reinforcing fibers so as to achieve the percentage of voids of not less than 85 volume percent;

placing the fiber-reinforced thermoplastic resin sheet expanded, to between a pair of female and male molds in at least one cavity surface of which a recessed portion is formed, and maintaining a heating state; and closing said molds to form a fiber-reinforced thermoplastic resin expanded body having a portion with a percertage of voids of not less than 85 volume percent and a portion with a percentage of voids of less than 50 volume percent at a same time.

* * * * *